A. B. NEUGARDT.
GANG PLOW.
APPLICATION FILED NOV. 28, 1910.
1,015,826.
Patented Jan. 30, 1912.
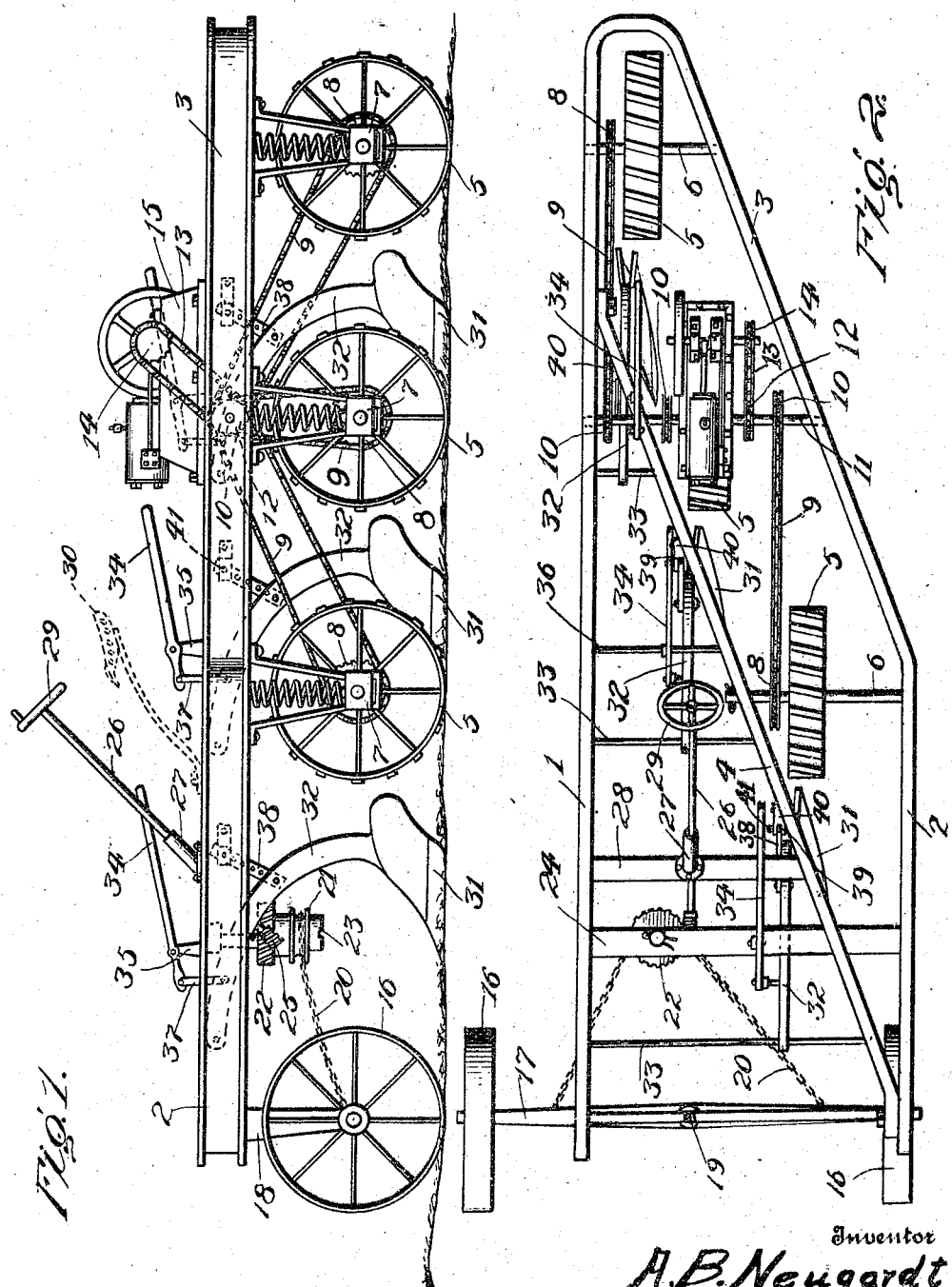

UNITED STATES PATENT OFFICE.

ANDREW B. NEUGARDT, OF TREVORTON, PENNSYLVANIA.

GANG-PLOW.

1,015,826.  Specification of Letters Patent.  Patented Jan. 30, 1912.

Application filed November 28, 1910. Serial No. 594,574.

*To all whom it may concern:*

Be it known that I, ANDREW B. NEUGARDT, a citizen of the United States, residing at Trevorton, in the county of Northumberland and State of Pennsylvania, have invented certain new and useful Improvements in Gang-Plows; and I do hereby declare the following to be a full, clear, and exact description of the invention, such as will enable others skilled in the art to which it appertains to make and use the same.

This invention relates to gang plows, and especially to gang plows carrying a motor on the frame thereof for propelling same.

The object of the invention is to provide a gang plow in which a driving wheel follows each plow and runs in the furrow.

Another object of the invention is to provide each plow with individual raising and lowering mechanism and a gage for regulating the depth of each furrow.

A further object of the invention is to provide a gang plow having a steering gear which is conveniently located and easily manipulated by the plowman.

With the above and other objects in view, the invention consists in certain combinations and arrangements of the parts as will be more fully understood as the description proceeds and the novel features thereof particularly pointed out in the appended claim.

The preferred embodiment of my invention is illustrated in the accompanying drawings forming a part of this specification, and in which like characters of reference indicate corresponding parts.

Figure 1 is an elevation of a gang plow constructed in accordance with my invention, and Fig. 2 is a plan view of the same.

Referring to the drawings, the frame of the machine consists of a long side 1 and a short side 2, joined together at their rear ends by an angular extending portion 3. Extending parallel to the portion 3, and connected to the sides of the frame is a diagonal brace 4.

The rear portion of the frame is supported by a plurality of driving wheels 5, carried by shafts 6, which are journaled in spring bearings 7 secured to the frame. Said wheels are arranged back of each other and spaced laterally for a purpose to be presently explained. Fastened on the shafts 6 are sprocket wheels 8, over which pass chains 9, leading from a plurality of sprocket wheels 10 on a shaft 11, journaled in the frame, and carrying a sprocket wheel 12, which is connected by a chain 13 with a sprocket wheel 14 on the driving shaft of a gas engine 15, or other suitable motor, carried by the frame.

The forward end of the frame is supported by guide wheels 16, rotatably mounted on an axle 17, which projects beyond the frame on the land side, and is carried by a rectangular-shaped bracket 18, which is pivotally connected to the frame by a bolt 19. Connected to the axle 17, on each side of the pivot bolt 19, is a steering chain 20, which passes around a pulley 21, integral with a worm wheel 22 and supported by a bolt 23 secured in a transverse bar 24 of the frame. The worm wheel 22 is engaged by a worm 25 on an inclined rod 26, journaled in a bearing 27, secured to a transverse bar 28 of the frame, and provided at its upper end with a hand wheel 29 for steering the machine. Conveniently arranged near said hand wheel is a seat 30 for the plowman.

Located in front of each driving wheel 5 is a plow 31, carried by a beam 32, which is pivotally connected to transversely extending rods 33, having their ends supported in the diagonal brace 4 and the long side of the frame 1. The plows are independently raised or lowered by means of handles 34, which are fulcrumed in brackets 35, fastened to the transverse bar 24 and transverse bars 36 of the frame, and connected to the plow beams 32 by links 37. A gage bar 38, provided with a plurality of apertures, is attached to each plow beam, and projects through a slot 39 in a member 40 connected to the diagonal brace 4. Pins 41 are inserted in one of the apertures in each bar 38 for supporting the plows in proper adjusted position. These pins are removed during the raising and lowering of the plows.

From the foregoing description, taken in connection with the drawings, it is readily seen that a gang plow constructed with a driving wheel following each plow will operate more smoothly and require less power to propel, as the wheels travel in the furrows, than when the wheels are located in front of the plows and must pass over the rough land. It will also be observed that the furrows will be of uniform depth.

Although the elements herein shown and described are well adapted to serve the purposes for which they are intended, it is to be understood that various changes in the form, proportion and the minor details of construction may be resorted to without departing from the spirit of the invention.

Having fully described my invention, what I claim and desire to secure by Letters Patent is:

A gang plow such as described consisting of a frame having parallel side members, one of said side members being longer than the other, the said side members being connected by a diagonal member, a diagonal brace parallel with said diagonal member, transversely extending rods between said diagonal brace and the longer side member, plows pivotally connected to said rods, driving wheels mounted between said diagonal brace and the shorter side and diagonal member and arranged back of each plow, and steering wheels mounted on the front end of said frame, substantially as described.

In testimony whereof I affix my signature in presence of two witnesses.

ANDREW B. NEUGARDT.

Witnesses:
WILLIAM PLUMMER,
LUKE JOHNSON.

Copies of this patent may be obtained for five cents each, by addressing the "Commissioner of Patents, Washington, D. C."